SPRAY OILS

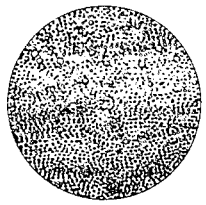

OLD MAYONNAISE TYPE
(Gum emulsifier)

Fig. 1

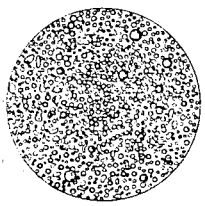

OLD TANK MIX TYPE
(¼ lb. blood albumen per 100 gal.
with fullers earth spreader.)

Fig. 2

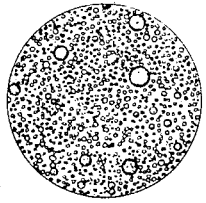

OLD SOLUBLE OR EMULSIBLE TYPE
(1% glycol mono-oleate + 2% aluminum naphthenate)

Fig. 3

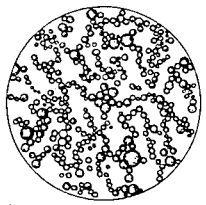

NEW SOLUBLE + ELECTRONIC CONDITIONER
(1% glycol mono-oleate + 2% aluminum naphthenate
+ ¼ lb. bentonite conditioner per 100 gal.)

Fig. 4

INVENTOR
Hugh Knight
BY Donald E. Payne
ATTORNEY

Patented Feb. 13, 1940

2,190,173

UNITED STATES PATENT OFFICE 2,190,173

OIL TREE SPRAY

Hugh Knight, Claremont, Calif., assignor, by mesne assignments, to Shell Development Company, a corporation of Delaware Application January 18, 1937, Serial No. 121,044

6 Claims. (Cl. 167—43)

This invention relates to oil tree sprays and it pertains more particularly to sprays for application to sensitive foliage such as citrus leaves, the leaves of shade trees and deciduous fruit trees, etc.

The object of my invention is to increase the effectiveness and safety of oil tree sprays. A further object is to provide an oil tree spray with an agent for depositing the oil on plant leaves as well as for releasing it from the aqueous emulsion. A further object is to provide a method and means for incorporating solids such as cryolite, or semi-solids such as waxes, with oil sprays in such a manner that they will be easily and readily dispersed without adverse effect on oil spray emulsion or oil deposit. A still further object is to increase the area of oil coverage obtainable by a given amount of oil, and to increase the actual amount of oil deposited from a given amount of spray, reducing to a minimum the amount of oil which has heretofore been lost in the run-off liquid or drip from plant leaves which were being sprayed.

Oil tree sprays may be classed in three types: No. 1, mayonnaise emulsions; No. 2, tank mix oils; and No. 3, soluble or miscible oils.

Mayonnaise emulsions are the most expensive and least effective. The same thing that renders them relatively ineffective renders them safe; the oil is dispersed in small droplets which are encased by interfacial films which in some instances may be said to act as capsules which prevent the release of the oil onto the plant leaves. Not only do mayonnaise emulsions contain about 15–30% of inert ingredients, but they are difficult to manufacture; they tend to break in transit and in storage under adverse conditions; they are often subject to bacterial decomposition; they cannot be mixed with some types of added insecticide materials and, all in all, they are far more expensive and less efficient than other types of oil sprays.

Tank mix oils are, as the name indicates, simply petroleum oils which are emulsified in the field by the addition of soaps, spreaders or other emulsifiers added to the water in the mixing tank before the addition of oil thereto; this type of spray cannot be made or applied with great uniformity and while more oil is released from the emulsion on the plant leaves than from mayonnaise emulsions, this oil tends to pile up on the leaves and to cause serious injury. The use of such oils requires an unusually high degree of skill on the part of the operator, and even when applied under most favorable conditions it is found that the oil has a tendency to penetrate into the plant leaves where it interferes with respiration and with translocation.

The third type of spray oils which are commonly referred to as "soluble oils" or "emulsible oils" are by far the most effective and efficient because the emulsifier is dissolved in the oil so that uniformity in emulsification and oil deposit is obtained even by relatively unskilled operators. This latter type of tree spray offers a further extremely important advantage of combining penetration control regulators with the oil so that when the oil is deposited on plant leaves it remains on the surface of the leaves and in contact with the plant parasites instead of penetrating into the leaves and causing metabolic disturbances. Examples of this last type of oil spray are shown in my prior Patents 1,949,798 and 1,949,799.

I have discovered that in most oil sprays less than 40% of the oil is actually deposited on plant leaves. The object of this invention is to provide a method and means for increasing the oil deposit from soluble or emulsible tree spray oils so that this type of tree spray will release the maximum amount of oil while retaining all the advantages of penetration control and avoiding the disadvantages of uneven deposit and injury which are inherent in tank-mix sprays.

Previous attempts to release the oil from emulsions by dissolving electrolytes either in the oil or the water phase have largely failed by reason of the fact that when sufficient electrolyte was incorporated to effect the required change, inversion of the emulsion invariably took place. By inversion is meant a change from "oil in water" to "water in oil" type emulsion, the latter, of course, being of buttery consistency and hence of no practical use as a tree spray. An object of my invention is to provide an oil-releasing agent which can be incorporated either in the oil phase or the water phase or in both phases without danger of inversion.

By an extended study of the amount of oil deposited by the various types of emulsions sprayed onto specially designed Ferrotype plates (which were selected because they resembled most closely the surface tension characteristics of citrus leaves), and checked by a photomicrographic study of the same emulsions I have discovered that there is a marked correlation between particle size and arrangement, spray pattern and area, and deposit of oil. I have discovered that there is a difference between the action of oil-releasing materials, such as higher alcohols and their esters, aluminum naphthenates, etc., and oil depositing materials which will hereinafter be described. I have discovered that these materials have a profound effect on the dispersion of the oil phase in the aqueous phase of a "soluble oil" emulsion, and since this effect appears to be due to imparted electrical charges, I have designated the material as electronic emulsion conditioners, (abbreviated E. E. C.)

An essential element of my electronic emulsion conditioner is colloidal aluminum silicate, preferably in the form of bentonite. I am aware of the fact that bentonite has long been used in oil emulsions of many kinds, but never before in combination with the oil soluble materials and electrolytes which I find are also essential for the obtaining of the desired spray characteristics. Bentonite is an emulsifier when used alone with water and oil but it offers no particular advantages over casein, blood albumen or other well-known "tank mix" emulsifiers—it produces large oil droplets with no particular tendency toward cluster formation and no electrostatic charge or electronic effects, as will be described. Bentonite has no appreciable effect on mayonnaise type emulsions, the size of oil droplets is not altered, their arrangement is not changed, and oil deposit from such emulsions is not increased. I have discovered however, that bentonite, particularly when employed with certain other agents, has the remarkable property of causing oil particles to become of more uniform size and to be grouped in clusters in the aqueous phase, leaving areas of free water between clusters. When this oil is sprayed onto leaves (or ferro type plates designed for test purposes), I find that the oil deposit is more than doubled, the size of the spray pattern is markedly increased, and that there is a remarkably small amount of oil in the run-off water or "drip." It is my theory that this is an electronic or electrical phenomenon, the oil droplets becoming electrically charged.

Field tests have shown that with radially decreased dosages, and hence increased safety to trees and foliage, I can effect even better protection than was heretofore obtained with the best available sprays. The oil is applied in lesser amounts to the leaves, but the bentonite mixture causes the oil to be deposited and held on the leaves in such a manner that crawling insects were annihilated without injury to respiration, transpiration or translocation in the plants' metabolism.

I have also discovered that my bentonite conditioners act to stabilize emulsions to which oil releasing materials like butyl stearate have been added, i. e., they prevent inversion of the emulsion but retain and even accentuate the oil releasing and depositing when the spray contacts a plant leaf.

Now, while I do not limit myself to any theory or explanation, I believe that my conditioners are effective because of an electrostatic or electronic charge on the bentonite particles which coacts with a charge on the oil particles and causes the formation of clusters of droplets, as hereinabove described. It has previously been shown that aluminum ions impart an electrostatic charge to finely divided lead arsenate in suspension which serves greatly to increase the deposit of this material (Jour. Econ. Ent. 29:1, 134–142). It occurred to me that the use of aluminum silicate in the form of bentonite might be employed in tree spray oils to provide an electrostatic charge which might have some effect in increasing deposit of oil on plant material. When one-fourth pound of any bentonite composition is added to 100 gallons of an aqueous emulsion of the soluble oil type the oil deposit is increased from about 30% to more than 75%.

My invention will be more clearly understood from the following detailed description read in connection with the accompanying drawing which forms a part of this specification and in which Fig. 1 represents a photomicrograph of oil droplets in a mayonnaise type emulsion;

Fig. 2 represents a photomicrograph of a tank mix emulsion;

Fig. 3 represents a photomicrograph of a soluble or emulsible type emulsion, and Fig. 4 represents an emulsion of the type shown in Fig. 3 as modified by my electronic conditioner. (Note "floc" formation.)

As a preferred embodiment of my invention I will describe the use of particular soluble or emulsible oil sprays in which my electronic conditioners have demonstrated a remarkable effectiveness in field tests. It should be understood, however, that the invention is equally applicable to the use of other soluble or emulsible tree spray oils ranging in viscosity from about 40 to 100 seconds Saybolt at 100° F. and ranging in unsulfonatable residue from 60 to 70 to 100%.

My soluble oil may be prepared by dissolving about 1% of glycol mono-oleate and about 2% aluminum naphthenate in a refined mineral oil having a viscosity at 100° F. of about 60–70 seconds Saybolt and an unsulfonatable residue of about 94 as determined by the California State method. When one gallon of this soluble oil is emulsified in 99 gallons of water (giving a 1% concentration) the oil particles are found to be dispersed rather evenly throughout the aqueous medium but are of extremely varying sizes, as illustrated in Fig. 3 of the drawing. When this 1% emulsion is sprayed onto plant leaves it is found that excellent and uniform coverage is obtained but that more than one-half of the oil runs off the leaves with the "drip."

In accordance with my invention I incorporate about one-fourth to one-half pound of my electronic conditioner into the aqueous phase after emulsification of the oil. The essential ingredient of my conditioner is a colloidal aluminum compound such as bentonite. To facilitate the dispersion of the bentonite in the aqueous phase I may add a small amount of kaolin or other clay. I have found that when casein is added to the bentonite it tends to enlarge the spray pattern and to produce a quick wetting flow spray which is very desirable and economical, if a proper oil release can be had at the same time. Since caseins will only dissolve in an alkaline medium I employ a small amount of tri-sodium phosphate—this being preferred over other alkaline media because of its well-known water softening effect and its peculiar quality of preventing inversion and of rectifying emulsions already inverted.

The preferred formula for my emulsion conditioner is as follows:

| | Parts |
|---|---|
| Bentonite | 8 |
| Kaolin | 2 |
| Casein | 2 |
| Tri-sodium phosphate | 1 |
| Soda ash | 1 |

In case of particularly hard waters the amount of tri-sodium phosphate may be increased or soda ash or other alkaline material may be used in place thereof or in addition thereto. In some cases the soda ash may be eliminated. With ordinary water I prefer to include ½ part of aluminum sulphate since this provides for maximum oil release and deposit.

When the spray, as above described, is applied to citrus trees it is found that the spreading and wetting of leaf surfaces is practically perfect and that the drip or run-off liquid is clear water. By using the emulsion conditioner I have found that an ample oil deposit may be obtained with even less than 1% of oil in the emulsion. By using a ¾% oil concentration with conditioner I obtain practically the same oil deposit that was heretofore obtained with a 1½% concentration.

The above soluble oil (at 0.8% concentration) and conditioner were found in field tests to give about 90% kill against red scale on citrus trees while a similar oil (at 1.25% concentration) with the same emulsifier but without the conditioner gave a kill of only about 77%. Thus, in the absence of conditioner, a 1.25% oil concentration left more than twice as many live scale as were left by the 0.8% oil concentration in the presence of the conditioner, the count being made about three weeks after spraying.

As above stated, the addition of a small amount of aluminum sulphate still further increases the oil deposit (raises it from 79% to 85%) and makes possible the use of still lower oil concentrations. With my conditioner I employ oil concentrations of ½ to 1%, while without the conditioner I find it necessary to use about 1.25 to 1.75% concentration. With eastern or Mid-Continent oil of high viscosity index I may use lower "doses" or concentrations than I can safely use with western oils, ¾% being about the lower limit in the case of the latter. It should be understood, of course, that the "dosage" may have to be increased in cases of heavy infestation to as high as 1.25% oil with conditioner (2% without conditioner).

Beneficial results may be obtained by the addition of small amounts of higher alcohols to my soluble oil sprays. While higher alcohols are less effective than conditioners of the colloidal aluminum compound type, I have found, for instance, that the oil deposit from a tree spray emulsified with 2% of glyco mono-oleate is increased from about 23% in the case of the glycol oleate solution to about 35% by the addition of 1% of butyl alcohol. The addition of 1% of cetyl alcohol increases the deposit to about 37% and 1% of octyl alcohol increases it to about 48%. Cetyl alcohol, myricyl alcohol and the like may cause inversion of the emulsion if they are employed in 1% concentrations, but they may be used in lesser amounts. About .1% myricyl alcohol with the 2% glycol mono-oleate emulsion gives an oil deposit of about 54%.

Esters as well as alcohols increase the liberation of oil and the oil deposit from the glycol mono-oleate tree sprays, an oil containing 1% of glycol mono-oleate and 1% of butyl stearate liberating about 40% oil and an emulsion containing 1% octyl acetate in place of the butyl stearate liberating about 56% of oil.

It will be noted that the higher alcohols and esters do not liberate as much oil as the electronic conditioner and in fact, these substances do not even give the same type of emulsion as is obtained by the use of the colloidal bentonite composition. Higher alcohols and esters tend toward the formation of larger oil particles and to facilitate release of oil, but the bentonite composition causes the formation of clusters of oil particles of smaller and much more uniform size. For optimum results I employ the conditioners with the higher alcohols or esters, and I find that the bentonite which was previously dispersed in the aqueous phase tends to prevent inversion of the emulsion even when relatively large quantities of higher alcohols and esters are employed. Inversion is probably an electrical phenomenon and is readily effected by soluble aluminum salts; however, I find that the colloidal aluminum silicates tend to hold the emulsion in its original phase (oil-in-water), merely causing the formation of clusters of oil droplets of fairly uniform size. While the electrical charge imparted by the bentonite does not cause inversion in the water phase, it evidently does cause the instantaneous release and deposit of the oil when it hits a leaf.

This deposit of substantially all of the oil immediately on contact with a leaf is extremely important from the safety standpoint.

By insuring the release and deposit of substantially all of the oil from the spray I not only effect a considerable economy in the amount of spray material required, but I avoid any possibility of too much oil being deposited on the leaves, because even if all of the oil in the spray is released and deposited, the amount will be sufficiently small to avoid plant injury.

While I have set forth my preferred embodiment of electronic emulsion conditioner composition, it should be understood that this is only by way of example. Instead of employing casein I may use blood albumen or other material commonly referred to in the art as a "spreader." I may eliminate the casein (spreader) and trisodium phosphate entirely and use merely colloidal aluminum silicate in the form of bentonite, preferably that sold in the market as Pyragel or Clayspur Wyoming bentonite. I find, however, that even when the spreader and trisodium phosphate are eliminated it may be desirable to include about 2 to 5% of sodium hydroxide or soda ash as an activator for the bentonite. The formula which I have found effective in hard waters is 12 parts Pyragel, 3 parts white clay, 3 parts trisodium phosphate and 1 part blood albumen. Another formula found effective is 4 parts Pyragel, 2 parts white clay, 1 part trisodium phosphate and 1 part casein. Still another formula is 4 parts Pyragel, 1 part Kayso spreader and 1 part trisodium phosphate. For maximum oil release and deposit, however, I prefer to use:

| | Parts |
|---|---|
| Pyragel bentonite | 8 |
| Kaolin or white clay | 2 |
| Casein | 2 |
| Trisodium phosphate | 1 |
| Soda ash | 1 |
| Aluminum sulfate | ½ |

(The aluminum sulfate is left out where hard waters are used.)

The soluble oils in which these conditioners are effective are preferably those which contain hydroxy esters of high molecular weight organic acids or oil soluble aluminum soaps, or both. Glycol mono-oleate and glycero mono- or di-oleates are preferred examples of the ester and aluminum naphthenate or aluminum oleate are preferred examples of the soaps. The emulsifier for the soluble oils may, for instance, comprise 1 part glycol mono-oleate and 2 parts of aluminum naphthenate, with or without 1 part of toxic naphthenic acid. Another preferred formula is ¾% glyco mono-oleate, 2% aluminum naphthenate and ½% naphthenic acid.

My invention is applicable to other so-called soluble or emulsible oils of this general type wherein the emulsifier is actually dissolved in the oil.

An important feature of my invention is the effectiveness of the bentonite in my conditioner for insuring a satisfactory emulsion and oil deposit when added toxic materials such as cryolite, lead arsenate, nicotine, rotenone or other toxic materials are incorporated in the emulsion. Such added materials may markedly interfere with proper emulsification and oil deposit in the absence of my conditioner. However, the bentonite composition insures proper emulsification and protects against inversion, and by causing the substantially complete deposite of oil it makes oil-soluble toxics such as rotenone and nicotine even more effective. In addition, bentonite has the function of inhibiting the evaporation of nicotine and prolonging its toxic efficiency—it appears to acts as an adhesive which prevents excessive loss of nicotine through run-off water in the drip. The bentonite conditioner has proven extremely useful for use in sprays applied to apple trees for the control of coddling moth, the bentonite with nicotine or other toxic taking the place of lead arsenate which has heretofore been almost universally used. Employment of soluble oils with my improved conditioners and with oil soluble toxics should go a long way toward the elimination of the health hazard which is inherent in the use of lead arsenate.

Since the oil droplets tend to form in clusters when my conditioner is used, a creamy mixture may rise to the surface of the spray tank when the pump is stopped, but this mixture is readily dispersed when the pump is again started.

While I have described in detail a preferred embodiment of my invention, it should be understood that I do not limit myself to any of the above details except as defined by the following claims which should be construed as broadly as the prior art will permit.

I claim:
1. The method of improving oil deposit from aqueous spray oil emulsions which comprises dispersing a small amount of bentonite in water, adding to said water an oil containing about 1% to 5% of an oil soluble emulsifier comprising an hydroxy ester of a high molecular weight organic acid, agitating the oil-water-bentonite mixture to form an emulsion characterized by clusters of oil particles and spraying said emulsion of clustered oil particles onto surfaces to effect the deposit of oil thereon.

2. A tree spray composition which comprises a mineral oil of about 40 to 100 seconds Saybolt viscosity at 100° F., containing in solution about 1% to 5% of an emulsifier comprising an hydroxy ester of a high molecular weight organic acid and containing out of solution a sufficient amount of bentonite to cause the formation of clusters of oil particles when the spray composition is agitated with water to effect emulsification.

3. The composition of claim 2 wherein the emulsifier also contains an oil soluble aluminum soap.

4. The composition of claim 2 which also includes a small amount of a high molecular weight alcohol.

5. A conditioner for improving the oil depositing properties of soluble oil emulsions containing an hydroxy ester of a high molecular weight organic acid and an oil soluble aluminum soap which comprises bentonite admixed with a small amount of a non-acid electrolyte.

6. The method of increasing the effectiveness in tree spray oils of oil soluble toxics of the class consisting of nicotine and rotenone, which method comprises incorporating said toxics in a mineral oil of about 40 to 100 seconds Saybolt viscosity at 100° F., adding to said oil about 1% to 5% of an emulsifier comprising an hydroxy ester of a high molecular weight organic acid, emulsifying said oil in water in the presence of a small amount of bentonite whereby oil clusters are formed in the water, and spraying said emulsion onto trees.

HUGH KNIGHT.